(12) United States Patent
Wang et al.

(10) Patent No.: US 11,794,291 B1
(45) Date of Patent: Oct. 24, 2023

(54) ASSEMBLING DEVICE FOR ROTATING JOINT OF ROTARY DRYING EQUIPMENT

(71) Applicant: ZHONGJIAN WUZHOU ENGINEERING EQUIPMENT CO., LTD, Nanjing (CN)

(72) Inventors: Yigui Wang, Nanjing (CN); Tianliang Jin, Nanjing (CN); Xiaorong Chen, Nanjing (CN); ShuangShuang Tao, Nanjing (CN); Jie Ren, Nanjing (CN); Wei Wei, Nanjing (CN); Ye Tian, Nanjing (CN); Qianyin Wang, Nanjing (CN); Yizhuan Qian, Nanjing (CN); Rui Yang, Nanjing (CN); Guoquan Chen, Nanjing (CN); Huihui He, Nanjing (CN); Zhengtao Zhang, Nanjing (CN); Bo Yang, Nanjing (CN); Yiqing Cheng, Nanjing (CN); Songxiao Li, Nanjing (CN); Hong Yang, Nanjing (CN); Wenyan Xu, Nanjing (CN); Xiangyu Liu, Nanjing (CN); Sanhai Wu, Nanjing (CN)

(73) Assignee: ZHONGJIAN WUZHOU ENGINEERING EQUIPMENT CO., LTD, Nanjing (CN)

( * ) Notice: Subject to any disclaimer, the term of this patent is extended or adjusted under 35 U.S.C. 154(b) by 0 days.

(21) Appl. No.: 18/346,847

(22) Filed: Jul. 4, 2023

Related U.S. Application Data

(63) Continuation of application No. PCT/CN2023/092826, filed on May 8, 2023.

(30) Foreign Application Priority Data

May 9, 2022 (CN) .......................... 202210497981.X

(51) Int. Cl.
 *B25B 11/02* (2006.01)
 *B23K 37/04* (2006.01)
 (Continued)

(52) U.S. Cl.
 CPC .......... *B23P 17/04* (2013.01); *B23K 37/0417* (2013.01); *B25B 11/02* (2013.01); *B23K 37/0538* (2013.01)

(58) Field of Classification Search
 CPC . B25B 11/02; B23K 37/0417; B23K 37/0538; Y10T 29/4989
 See application file for complete search history.

(56) References Cited

U.S. PATENT DOCUMENTS

| 3,888,103 A * | 6/1975 | Renshaw ........... B23K 37/0536 72/399 |
| 2016/0016267 A1* | 1/2016 | Beatty ................ B23K 37/0452 29/559 |
| 2022/0049954 A1 | 2/2022 | Lai |

FOREIGN PATENT DOCUMENTS

| CN | 107570929 A | 1/2018 |
| CN | 111266844 A | 6/2020 |

(Continued)

OTHER PUBLICATIONS

CNIPA, Search Report for CN202210497981X, dated Apr. 6, 2023.
(Continued)

*Primary Examiner* — Jermie E Cozart
(74) *Attorney, Agent, or Firm* — Zhigang Ma

(57) ABSTRACT

The present disclosure discloses an assembling device for a rotating joint of rotary drying equipment, including a telescopic upright column; a mounting sleeve is fixed at a top of the telescopic upright column; an inner end of each bevel gear is connected with a first screw rod; the first screw rods are sleeved with fixed rods through threads; a microprocessor is fixed at a bottom of the mounting sleeve; a motor is
(Continued)

fixed at a top of the mounting sleeve; an oil slot formed in an inner wall of a top of a detection tooth ring is internally connected with a detection seat through a first elastic telescopic rod; an adjustment rod is embedded into a right bottom of the detection seat in an elastic sliding manner through a spring.

7 Claims, 5 Drawing Sheets

(51) Int. Cl.
*B23P 17/04* (2006.01)
*B23K 37/053* (2006.01)

(56) References Cited

FOREIGN PATENT DOCUMENTS

| | | | |
|---|---|---|---|
| CN | 210741409 | A | 6/2020 |
| CN | 211121100 | A | 7/2020 |
| CN | 111644747 | A | 9/2020 |
| CN | 112264704 | A | 1/2021 |
| CN | 112361997 | A | 2/2021 |
| CN | 212931347 | A | 4/2021 |
| CN | 113203267 | A | 8/2021 |
| CN | 214790381 | A | 11/2021 |
| CN | 215983684 | A | 3/2022 |
| CN | 114857883 | A | 8/2022 |
| DE | 102008048572 | A | 3/2010 |
| KR | 101157014 | A | 6/2012 |
| WO | 2013026573 | A | 2/2013 |

OTHER PUBLICATIONS

CNIPA, Notification to grant patent right for Chinese application CN202210497981X, dated Apr. 15, 2023.
ISR of PCT/CN2023/092826.

\* cited by examiner

ASSEMBLING DEVICE FOR ROTATING JOINT OF ROTARY DRYING EQUIPMENT

TECHNICAL FIELD

The present disclosure relates to the technical field of rotary drying equipment of insoluble sulfur, specifically to an assembling device for a rotating joint of rotary drying equipment.

BACKGROUND

With the popularization of highways in China and the rapid development of the automobile industry in China, the radial tire industry will continue to be developed rapidly in the coming years, which will inevitably lead to strong growth in demand for insoluble sulfur. The domestication and exporting potential of the insoluble sulfur is enormous. A rotary tank is core equipment in high-performance insoluble sulfur projects. As the equipment is rotating equipment, a housing of the equipment is equivalent to a giant rotating shaft. During mounting of a rotating joint, it is necessary to cooperate with an assembling device for rotating joints for welding mounting. However, the existing assembling device for rotating joints has the following problems during use:

There is a high requirement for the manufacturing accuracy of the rotary tank, which requires that an axial runout and a circumferential runout of a rotating joint flange on the rotary tank are controlled within 0.5 mm. In pairing and welding processes of the rotating joint flange, it is necessary to continuously adjust the position of the rotating joint to ensure its axial runout and circumferential runout. It is not convenient for the existing assembling device for a rotating joint to perform automatic circumferential offset detection on the rotating joint during cooperative welding. It is difficult to control the overall mounting accuracy of the rotating joint. Meanwhile, it is also inconvenient to perform automatic circumferential full-angle stable adjustment during offset adjustment. After frequent manual detection, frequent adjustment of corresponding positions then needs to be performed, so that the operation is complicated. In addition, the adjustment effect is poor, which affects subsequent running of the rotary tank.

In terms of the above issues, an innovative design is urgently needed on the basis of the original assembling device for a rotating joint.

SUMMARY

The present disclosure aims to provide an assembling device for a rotating joint of rotary drying equipment, to solve the following problems mentioned in the background section: It is not convenient for the existing assembling device for a rotating joint to perform automatic circumferential offset detection on the rotating joint and it is not convenient to perform automatic circumferential full-angle stable adjustment.

In order to achieve the above objective, the present disclosure provides the following technical solution: An assembling device for a rotating joint of rotary drying equipment includes a telescopic upright column, wherein a mounting sleeve is fixed at a top of the telescopic upright column; gear rings are movably mounted outside the mounting sleeve in an embedded manner; one side of each gear ring is engaged with a bevel gear; the bevel gears are movably mounted inside the mounting sleeve in an embedded manner; an inner end of each bevel gear is connected with a first screw rod; the first screw rods are mounted in movement slots through bearings; the movement slots are formed in an inner wall of the mounting sleeve; the first screw rods are sleeved with fixed rods through threads; inner ends of the fixed rods are welded with fixed plates; rotating joint bodies are placed in the fixed plates; one end of each rotating joint body is plugged into a flange cover at an end portion of a rotary drying equipment body; a microprocessor is fixed at a bottom of the mounting sleeve;

the assembling device includes:

a motor, wherein the motor is fixed at a top of the mounting sleeve; an output end of the motor is connected with a driving gear; a detection tooth ring is engaged below the driving gear; the detection tooth ring is movably mounted inside the mounting sleeve in an embedded manner; the detection tooth ring is located at a position on a left side of the fixed rod; an oil slot formed in an inner wall of a top of a detection tooth ring is internally connected with a detection seat through a first elastic telescopic rod; a mounting plate is fixed at a left bottom of the detection seat; a laser ranger is fixed on an inner side of the mounting plate; an adjustment rod is embedded into a right bottom of the detection seat in an elastic sliding manner through a spring; an adjustment head is integrally arranged at one end of the adjustment rod; the adjustment rod is located between the fixed rods and the laser ranger; an electric push rod is fixedly embedded in a middle bottom of the detection seat; an output end of the electric push rod is connected with a cross bar; one end of the cross bar is located in a guide slot; the guide slot penetrating therethrough is formed in the middle of the adjustment rod; and an oil tank, wherein the oil tank is fixed at the top of the mounting sleeve; a second screw rod penetrating therethrough is mounted at a top of the oil tank through a bearing; the second screw rod is sleeved with a piston plate through a thread; the piston plate is located in the oil tank; openings penetrating therethrough are formed in a bottom of the oil tank and in the tops of the mounting sleeve and the detection tooth ring; and the openings in the bottom of the oil tank and in the tops of the mounting sleeve and the detection tooth ring and the oil slot formed in the inner wall of the detection tooth ring interpenetrate each other.

Preferably, a top of each bevel gear is connected with a guide rod; one end of each guide rod is located at the top of the mounting sleeve; the guide rods are connected with the second screw rod through synchronous belts; and the gear rings drive the bevel gears to rotate, so that the second screw rod can be driven to rotate by the guide rods and the synchronous belts.

Preferably, the fixed rods abut against and slide in the movement slots through the first screw rods; the fixed plate at one end of each fixed rod is of an inwards sunken arc-shaped structure; the fixed rods are distributed in the mounting sleeve at an equal angle; and inner ends of the fixed plates are adhered with rubber sheets. The bevel gears drive the first screw rods to rotate, which can drive the fixed rods to move. A plurality of fixed rods cooperate with the fixed plates to align and clamp rotating joints.

Preferably, a front section of the detection tooth ring is of an "I"-shaped structural design, and the detection tooth ring and the mounting sleeve have a same central axis. The motor drives the driving gear to rotate, which can drive the detection tooth ring to stably rotate in the mounting sleeve.

Preferably, the detection seat abuts against and slides through the first elastic telescopic rod; the detection seat is parallel to each fixed rod; and the detection seat moves under an oil pressure in the oil slot, so that the detection seat and the fixed rod move synchronously.

Preferably, the adjustment head at the end portion of the adjustment rod is of an arc-shaped protrusion structural design; and a position of the adjustment rod corresponds to a position of the laser ranger. The adjustment rod moves with the movement of the detection seat; at the same time, during the movement of the adjustment rod, the positions of the rotating joints are adjusted through the adjustment head; and laser emitted by the laser ranger is reflected by the adjustment rod.

Preferably, an end portion of the cross bar is of an inclined structural design; the inclined end of the cross bar is parallel to a bottom inclined plane of the guide slot; the electric push rod pushes the cross bar to move; and the cross bar drives the adjustment rod to move through the guide slot.

Compared with the prior art, the present disclosure has the following beneficial effects:

1. According to the present disclosure provided with a synchronous adjustment mechanism and the rotating gear rings, the plurality of fixed rods are driven to synchronously move by the bevel gears and the first screw rods. The fixed plates on the fixed rods cooperate with the rubber sheets at the bottoms to align and clamp the rotating joints. Meanwhile, since the bevel gears rotate, the second screw rod is driven to rotate by the guide rods and the synchronous belts. The second screw rod drives the piston plate to synchronously move, so that oil in the oil tank is pressed into the oil slot. The detection seat is pushed to move under the pressure of the oil, so that the detection seat and the fixed rods move synchronously. Thus, when the rotating joints with different diameters are fixed and clamped by the fixed rods, the detection seat, the laser ranger at the bottom of the detection seat, and the adjustment rod move synchronously therewith, to facilitate using the laser ranger to detect offsets of the rotating joints subsequently and using the adjustment rod to correct the rotating joints. For the rotating joints with different diameters, the present disclosure can still achieve automatic offset detection and correction operations.

2. According to the present disclosure provided with an automatic offset detection and correction mechanism, in an initial state, the laser emitted by the laser ranger irradiates the adjustment rod against exteriors of flanges at end portions of the rotating joints. The laser emitted by the laser ranger is reflected by the adjustment rod. The adjustment rod and the laser ranger are relatively fixed, so that when the laser ranger detects a distance from the adjustment rod to a rotating joint, the rotating joint is aligned in this distance. In a welding process, when an end portion of the rotating joint has a slight offset from the flange cover, an offset distance of a position at the other end of the rotating joint increases as the rotating joint extends. Thus, the laser emitted by the laser ranger is prevented from being reflected by the end portion of the rotating joint, and the distance measured by the laser ranger decreases, thus identifying that this position has an offset. The microprocessor controls the electric push rod to run; the cross bar is plugged into the guide slot; the adjustment rod is pushed to move down; and the adjustment head on the adjustment rod pushes the rotating joint to be corrected. The relative position of the adjustment rod and the position of the fixed rod are synchronous, and a movement distance of the adjustment rod pushed by the cross bar is constant, so that the rotating joint can be pushed to be corrected only by pushing the adjustment rod to an extreme distance. At the same time, the motor drives the driving gear to rotate to drive the detection tooth ring to rotate, thus driving the laser ranger and the adjustment rod to rotate. As the adjustment rod is pushed and reset, automatic offset detection and correction can be performed on any circumferential position of the rotating joint, without performing complicated manual detection on the rotating joint, so the correction accuracy is improved.

3. In summary, according to the present disclosure, the fixed rods are used to fix and initially align the rotating joints, and the laser ranger capable of circumferentially rotating is used to cooperatively detect a distance from the adjustment rod to a rotating joint. Therefore, when a rotating joint has an offset, the laser ranger detects that the distance changes and can identify that this site on the rotating joint has an offset. The electric push rod then drives the adjustment rod to move to automatically correct this site. By the rotation of the detection tooth ring, any circumferential position of the rotating joint can be detected and corrected in real time. Furthermore, the rotating joints with different diameters are flexibly fixed by the fixed rods. By the cooperation with the oil tank, the positions of the laser ranger and the adjustment rod are adaptively adjusted to achieve the automatic offset detection and correction operations on the rotating joints with different diameters, without manual frequent measurement. In addition, the defect that a correction position cannot be conveniently found by manual correction is solved.

Figure 1:
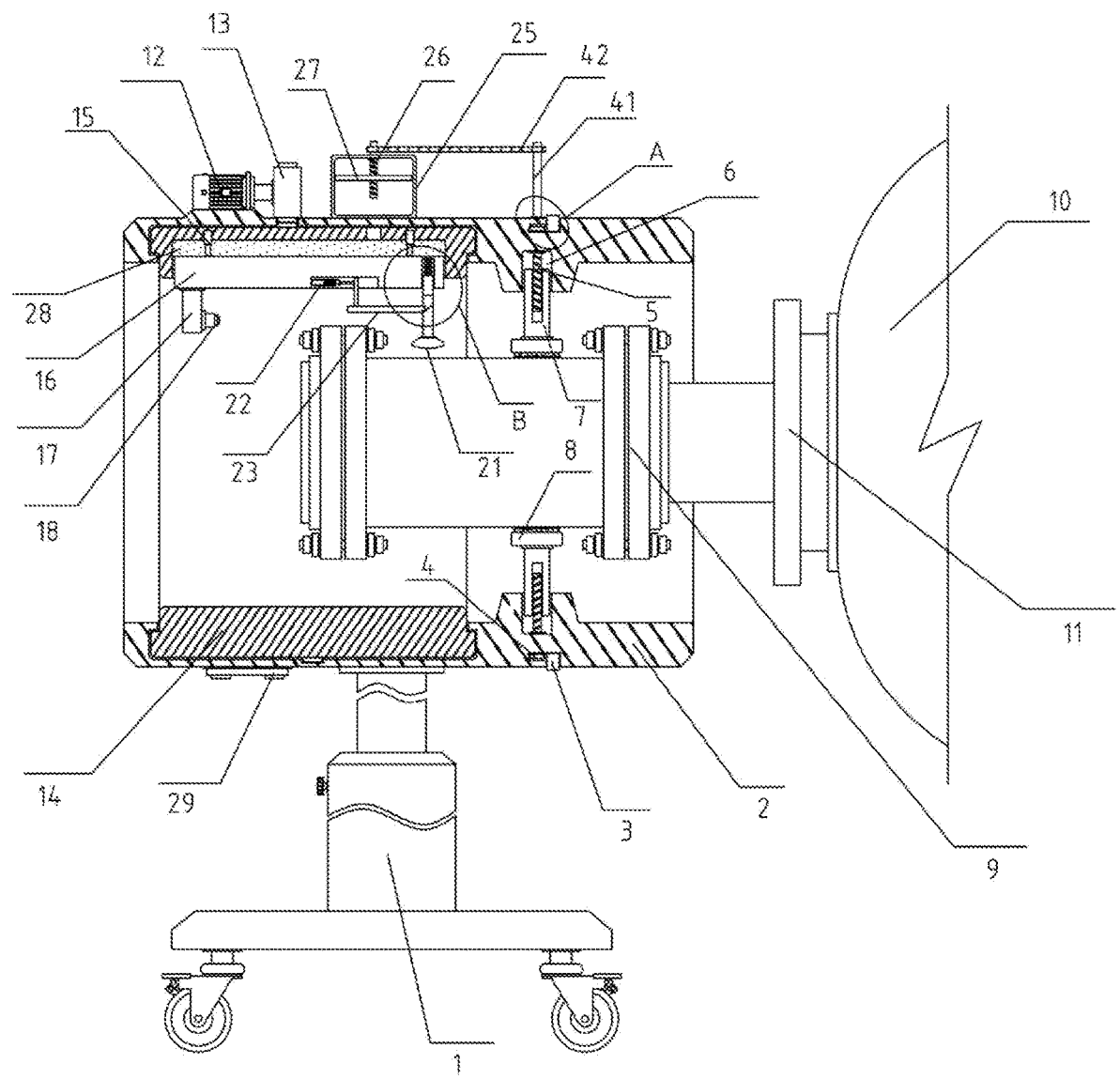
FIG. 1 is a schematic diagram of a front sectional structure of the present disclosure.
Figure 2:
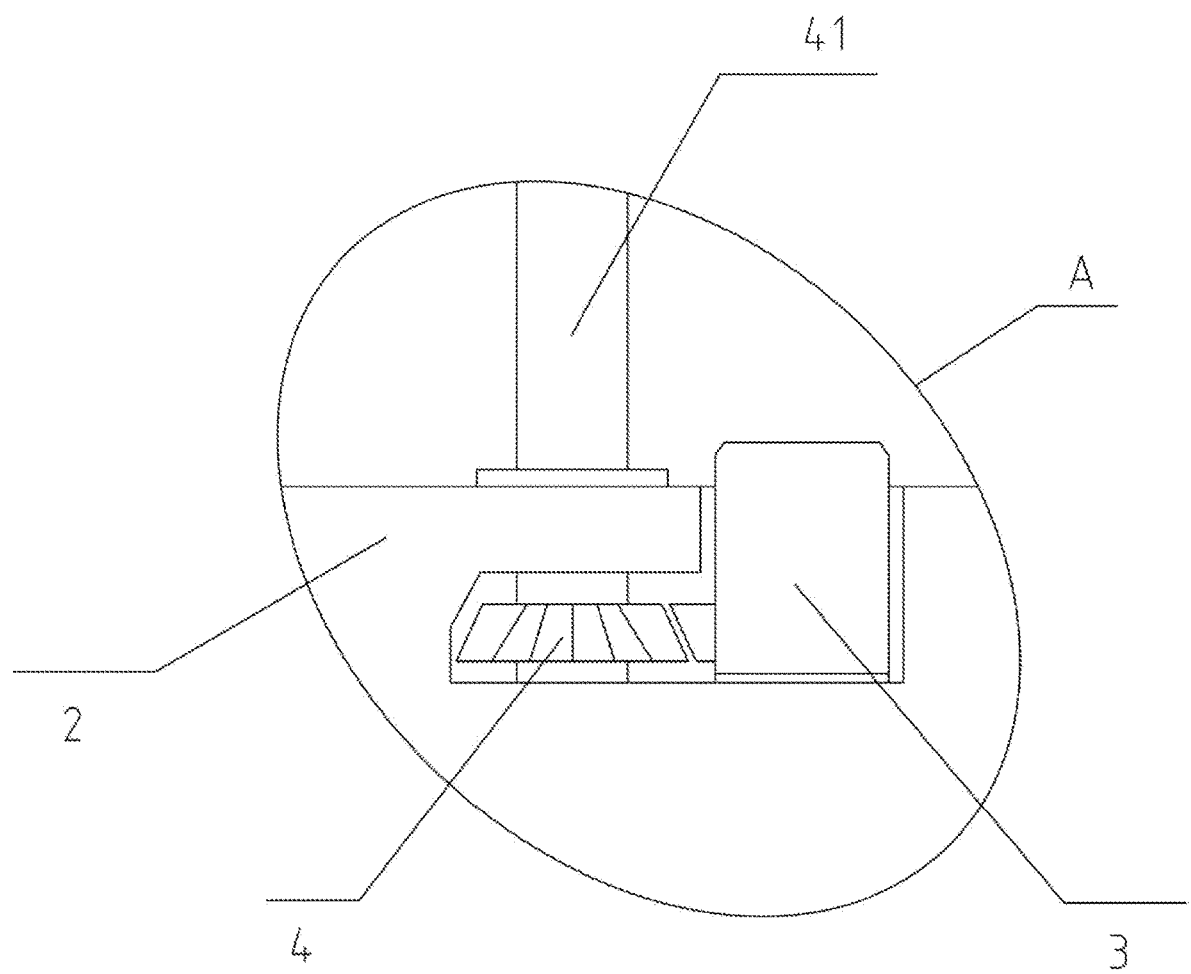
FIG. 2 is a schematic diagram of an enlarged structure of a portion A of the present disclosure in FIG. 1.

In the drawing: 1: telescopic upright column; 2: mounting sleeve; 3: gear ring; 4: bevel gear; 41: guide rod; 42: synchronous belt; 5: first screw rod; 6: movement slot; 7: fixed rod; 8: fixed plate; 9: rotating joint body; 10: rotary drying equipment body; 11: flange cover; 12: motor; 13: driving gear; 14: detection tooth ring; 15: first elastic telescopic rod; 16: detection seat; 17: mounting plate; 18: laser ranger; 19: spring; 20: adjustment rod; 21: adjustment head; 22: electric push rod; 23: cross bar; 24: guide slot; 25: oil tank; 26: second screw rod; 27: piston plate; 28: oil slot; and 29: microprocessor.

DETAILED DESCRIPTION OF THE EMBODIMENTS

The technical solutions in the embodiments of the present disclosure will be described clearly and completely below in combination with the accompanying drawings of the embodiments of the present disclosure. Apparently, the described embodiments are only part of the embodiments of the present disclosure, not all embodiments. All other embodiments obtained by those of ordinary skill in the art based on the embodiments in the present disclosure without creative work shall fall within the protection scope of the present disclosure.

Referring to FIG. 1 to FIG. 5, the present disclosure provides a technical solution: An assembling device for a rotating joint of rotary drying equipment includes a telescopic upright column 1, a mounting sleeve 2, gear ring 3, bevel gears 4, guide rods 41, synchronous belts 42, first screw rods 5, movement slots 6, fixed rods 7, fixed plates 8, rotating joint bodies 9, a rotary drying equipment body 10, a flange cover 11, a motor 12, a driving gear 13, a detection tooth ring 14, a first elastic telescopic rod 15, a detection seat 16, a mounting plate 17, a laser ranger 18, a spring 19, an adjustment rod 20, an adjustment head 21, an electric push rod 22, a cross bar 23, a guide slot 24, an oil tank 25, a second screw rod 26, a piston plate 27, an oil slot 28, and a microprocessor 29.

Embodiment 1

Figure 3:
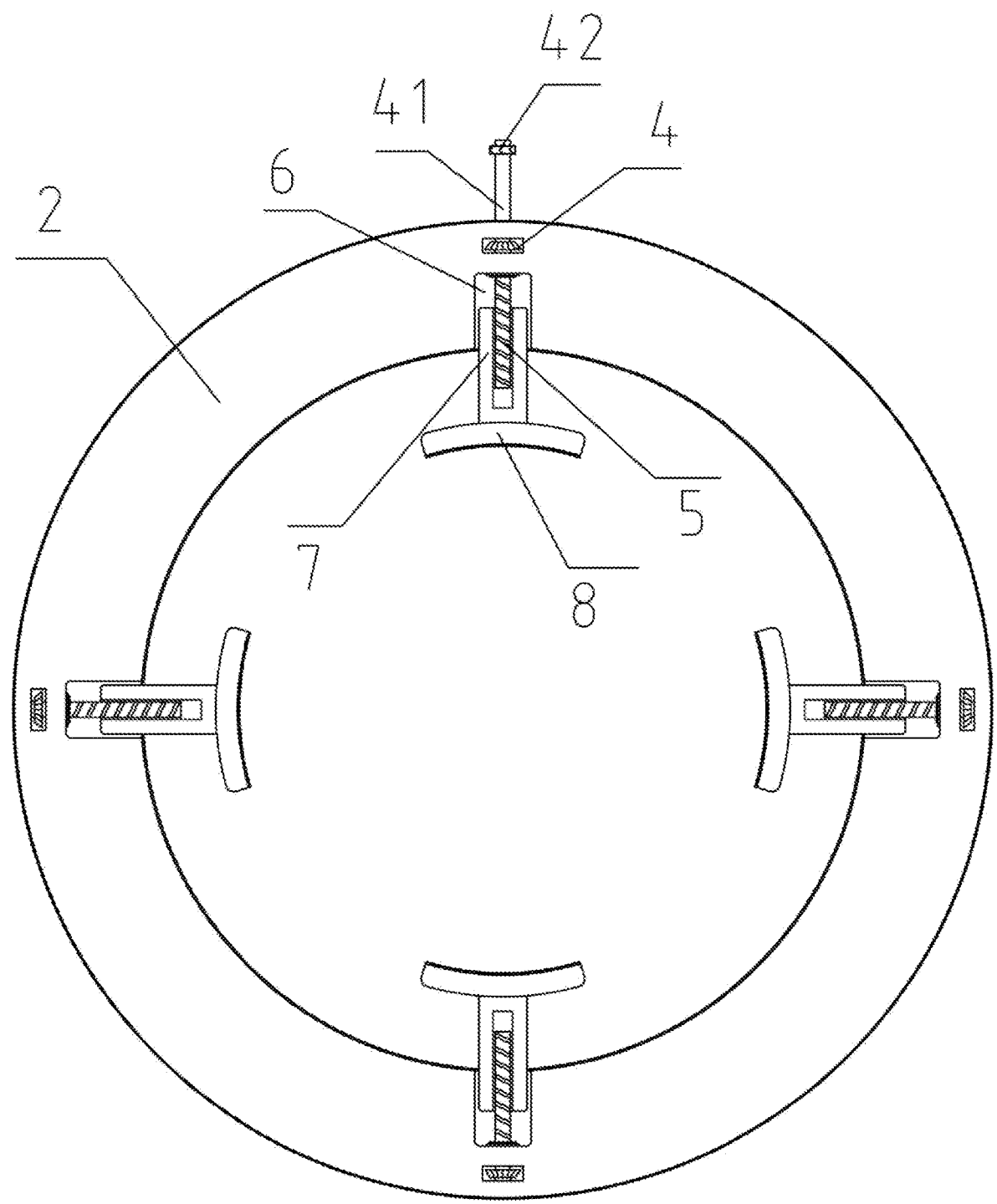
FIG. 3 is a schematic diagram of a side sectional structure of a fixed rod of the present disclosure.

Referring to FIG. 1 and FIG. 3, an assembling device for a rotating joint of rotary drying equipment includes a telescopic upright column 1. A mounting sleeve 2 is fixed at a top of the telescopic upright column 1. Gear rings 3 are movably mounted outside the mounting sleeve 2 in an embedded manner. One side of each gear ring 3 is engaged with a bevel gear 4. The bevel gears 4 are movably mounted inside the mounting sleeve 2 in an embedded manner. Inner ends of the bevel gears 4 are connected with first screw rods 5. The first screw rods 5 are mounted in movement slots 6 through bearings. The movement slots 6 are formed in an inner wall of the mounting sleeve 2. The first screw rods 5 are sleeved with fixed rods 7 through threads. Inner ends of the fixed rods 7 are welded with fixed plates 8. Rotating joint bodies 9 are placed in the fixed plates 8. One end of each rotating joint body 9 is plugged into a flange cover 11 at an end portion of a rotary drying equipment body 10. A microprocessor 29 is fixed at a bottom of the mounting sleeve 2. The fixed rods 7 abut against and slide in the movement slots 6 through the first screw rods 5. The fixed plate 8 at one end of each fixed rod 7 is of an inwards sunken arc-shaped structure. The fixed rods 7 are distributed in the mounting sleeve 2 at an equal angle. Inner ends of the fixed plates 8 are adhered with rubber sheets. The mounting sleeve 2 sleeves the rotating joint bodies 9. The rotating gear rings 3 drive the plurality of fixed rods 7 to synchronously move. The rotating joint bodies 9 are aligned, clamped and fixed by the fixed plates 8. The position and height of the telescopic upright column 1 are then moved and adjusted to plug one end of each fixed rotating joint body 9 into an inner ring of the flange cover 11 on the rotary drying equipment body 10 for preliminary fixing for spot welding.

Embodiment 2

Figure 4:
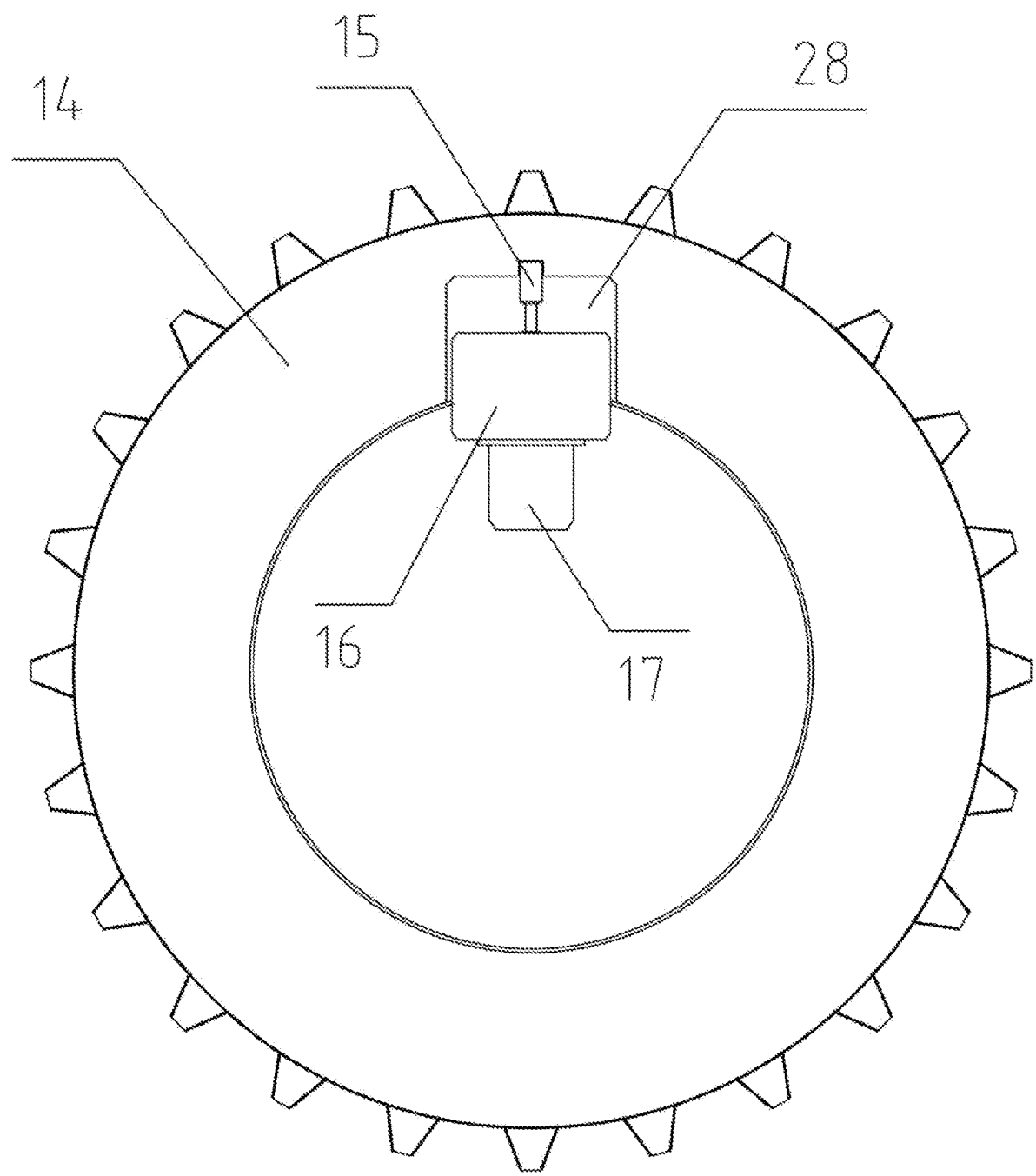
FIG. 4 is a schematic diagram of a side sectional structure of a detection tooth ring of the present disclosure.
Figure 5:
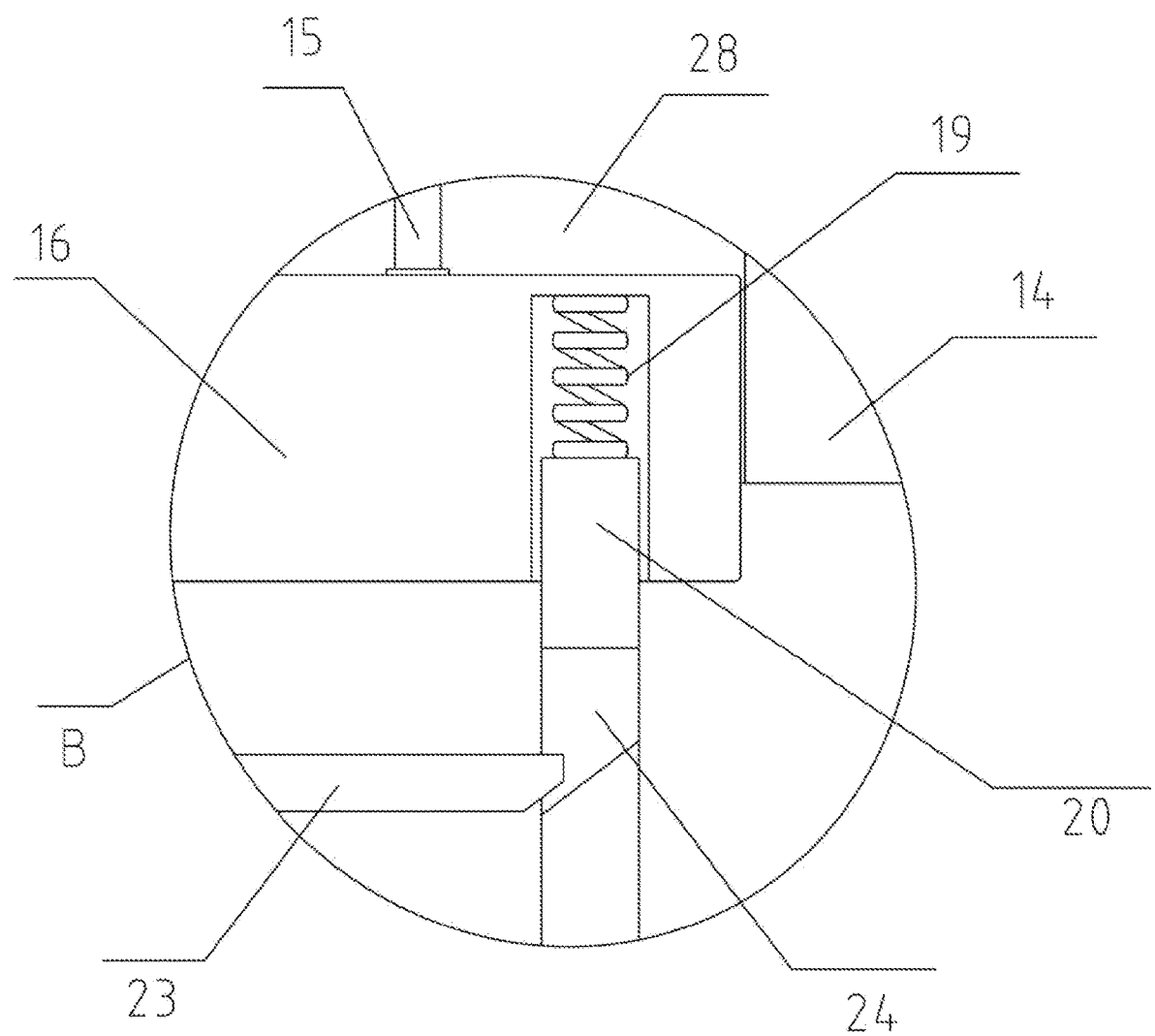
FIG. 5 is a schematic diagram of an enlarged structure of a portion B of the present disclosure in FIG. 1.

Referring to FIG. 1 and FIG. 4 to FIG. 5, a motor 12 is fixed at a top of the mounting sleeve 2. An output end of the motor 12 is connected with a driving gear 13. A detection tooth ring 14 is engaged below the driving gear 13. The detection tooth ring 14 is movably mounted inside the mounting sleeve 2 in an embedded manner. The detection tooth ring 14 is located at a position on a left side of the fixed rod 7. An oil slot 28 formed in an inner wall of a top of a detection tooth ring 14 is internally connected with a detection seat 16 through a first elastic telescopic rod 15. A mounting plate 17 is fixed at a left bottom of the detection seat 16. A laser ranger 18 is fixed on an inner side of the mounting plate 17. An adjustment rod 20 is embedded into a right bottom of the detection seat 16 in an elastic sliding manner through a spring 19. An adjustment head 21 is integrally arranged at one end of the adjustment rod 20. The adjustment rod 20 is located between the fixed rods 7 and the laser ranger 18. An electric push rod 22 is fixedly embedded in a middle bottom of the detection seat 16. An output end of the electric push rod 22 is connected with a cross bar 23. One end of the cross bar 23 is located in a guide slot 24. The guide slot 24 penetrating therethrough is formed in the middle of the adjustment rod 20. A front section of the detection tooth ring 14 is of an "I"-shaped structural design, and the detection tooth ring 14 and the mounting sleeve 2 have a same central axis. The detection seat 16 abuts against and slides through the first elastic telescopic rod 15. The detection seat 16 is parallel to each fixed rod 7. The adjustment head 21 at the end portion of the adjustment rod 20 is of an arc-shaped protrusion structural design; and a position of the adjustment rod 20 corresponds to a position of the laser ranger 18. An end portion of the cross bar 23 is of an inclined structural design, and the inclined end of the cross bar 23 is parallel to a bottom inclined plane of the guide slot 24. The motor 12 drives the detection tooth ring 14 to rotate through the driving gear 13. An offset of a single rotating joint body 9 is detected by using the laser ranger 18 to measure a distance, and the electric push rod 22 pushes the cross bar 23 to move, thus pushing the adjustment rod 20 and the adjustment head 21 to move towards the rotating joint body 9 to achieve fixed-point correction on the rotating joint body 9.

Embodiment 3

Referring to FIG. 1 to FIG. 4, an oil tank 25 is fixed at the top of the mounting sleeve 2. A second screw rod 26 penetrating therethrough is mounted at a top of the oil tank 25 through a bearing. The second screw rod 26 is sleeved with a piston plate 27 through a thread. The piston plate 27 is located in the oil tank 25. Openings penetrating therethrough are formed in a bottom of the oil tank 25 and in the tops of the mounting sleeve 2 and the detection tooth ring 14. The openings in the bottom of the oil tank 25 and in the tops of the mounting sleeve 2 and the detection tooth ring 14 and the oil slot 28 formed in the inner wall of the detection tooth ring 14 interpenetrate each other. A top of each bevel gear 4 is connected with a guide rod 41. One end of each guide rod 41 is located at the top of the mounting sleeve 2. The guide rods 41 are connected with the second screw rod 26 through synchronous belts 42. When the gear rings 3 are rotated to fix the rotating joint bodies 9 of different specifications through the fixed rods 7 and the fixed plates 8, the bevel gears 4 drive the second screw rod 26 to rotate through the guide rods 41 and the synchronous belts 42. Since the piston plate 27 moves, oil is pushed into the oil slot 28 to push the detection seat 16 to move, thereby maintaining relative positions of the laser ranger 18, the adjustment rod 20, and the fixed rods 7.

Working principle: To use the assembling device for the rotating joint of the rotary drying equipment, as shown in FIG. 1 to FIG. 4, the mounting sleeve 2 first sleeves the rotating joint bodies 9. The gear rings 3 are rotated. The gear rings 3 are engaged with the bevel gears 4 to drive the plurality of bevel gears 4 and the plurality of first screw rods 5 to rotate. The first screw rods 5 drive the fixed rods 7 to slide in the movement slots 6, so that the rotating joint bodies 9 are aligned and clamped by the fixed rods 7 and the fixed plates 8. The rubber sheets on the fixed plates 8 reserve a space for subsequent offsets of the rotating joint bodies 9, to avoid damage to the equipment caused by a forced offset. The telescopic upright column 1 is then moved to adjust its height. The rotating joint bodies 9 are butted with the flange cover 11 on the rotary drying equipment body 10 for preliminary spot welding. When the bevel gears 4 are rotated by a force, the second screw rod 26 can be driven to rotate by the guide rods 41 and the synchronous belts 42, thereby driving the piston plate 27 to slide in the oil tank 25 to press the oil in the oil tank 25 into the oil slot 28, which pushes the detection seat 16 to move down. Therefore, the positions of the laser ranger 18 and the adjustment rod 20 are adjusted as the fixed rods 7 move.

Next, as shown in FIG. 1 and FIG. 4 to FIG. 5, during subsequent welding, the motor 12 is started. The motor 12 drives the detection tooth ring 14 to rotate in the mounting sleeve 2 through the driving gear 13. The detection tooth ring 14 is rotated through the detection seat 16. The mounting plate 17 at the bottom of the detection seat 16 drives the laser ranger 18 to rotate, and the adjustment rod 20 synchronously moves therewith at the same time. When the laser ranger 18 is started, laser reflection is performed through the adjustment rod 20. A distance measured by the laser ranger 18 is an initial distance. In the rotating process, the laser ranger 18 continuously measures distances. If a rotating joint body 9 has an offset, its end portion will block the laser. At this time, the distance measured by the laser ranger 18 decreases. The microprocessor 29 performs signal processing to prove that this site has an offset. The microprocessor 29 controls the electric push rod 22 to run and stops the motor 12. The electric push rod 22 pushes the cross bar 23 to be plugged into the guide slot 24, thereby driving the adjustment rod 20 and the adjustment head 21 to move. When the adjustment head 21 moves to an extreme distance, the adjustment head 21 and the fixed plates 8 are located on the same horizontal plane, and the offset of the rotating joint body 9 at this site is automatically corrected. The electric push rod 22 is then reset. The adjustment rod 20 is reset under the action of the spring 19. The adjustment head 21 and the rotating joint body 9 are separated, which achieves one correction operation. The motor 12 is started again to perform circumferential detection and correction on the rotating joint bodies 9 until the rotating joint bodies 9 are completely welded.

Although the present disclosure has been described in detail with reference to the foregoing embodiments, those skilled in the art still can modify the technical solutions disclosed in the foregoing various embodiments, or make equivalent replacement to partial technical features. Any modifications, equivalent replacements, improvements and the like that are made without departing from the spirit and principle of the present disclosure shall all fall within the protection scope of the present disclosure.

What is claimed is:

1. An assembling device for a rotating joint of rotary drying equipment, comprising a telescopic upright column (1), wherein a mounting sleeve (2) is fixed at a top of the telescopic upright column (1); gear rings (3) are movably mounted outside the mounting sleeve (2) in an embedded manner; one side of each gear ring (3) is engaged with a bevel gear (4); the bevel gears (4) are movably mounted inside the mounting sleeve (2) in an embedded manner; inner ends of the bevel gears (4) are connected with first screw rods (5); the first screw rods (5) are mounted in movement slots (6) through bearings; the movement slots (6) are formed in an inner wall of the mounting sleeve (2); the first screw rods (5) are sleeved with fixed rods (7) through threads; inner ends of the fixed rods (7) are welded with fixed plates (8); rotating joint bodies (9) are placed in the fixed plates (8); one end of each rotating joint body (9) is plugged into a flange cover (11) at an end portion of a rotary drying equipment body (10); a microprocessor (29) is fixed at a bottom of the mounting sleeve (2);

the assembling device further comprises:
a motor (12), wherein the motor (12) is fixed at a top of the mounting sleeve (2); an output end of the motor (12) is connected with a driving gear (13); a detection tooth ring (14) is engaged below the driving gear (13); the detection tooth ring (14) is movably mounted inside the mounting sleeve (2) in an embedded manner; the detection tooth ring (14) is located at a position on a left side of the fixed rod (7); an oil slot (28) formed in an inner wall of a top of a detection tooth ring (14) is internally connected with a detection seat (16) through a first elastic telescopic rod (15); a mounting plate (17) is fixed at a left bottom of the detection seat (16); a laser ranger (18) is fixed on an inner side of the mounting plate (17); an adjustment rod (20) is embedded into a right bottom of the detection seat (16) in an elastic sliding manner through a spring (19); an adjustment head (21) is integrally arranged at one end of the adjustment rod (20); the adjustment rod (20) is located between the fixed rods (7) and the laser ranger (18); an electric push rod (22) is fixedly embedded in a middle bottom of the detection seat (16); an output end of the electric push rod (22) is connected with a cross bar (23); one end of the cross bar (23) is located in a guide slot (24); the guide slot (24) penetrating therethrough is formed in the middle of the adjustment rod (20); and an oil tank (25), wherein the oil tank (25) is fixed at the top of the mounting sleeve (2); a second screw rod (26) penetrating therethrough is mounted at a top of the oil tank (25) through a bearing; the second screw rod (26) is sleeved with a piston plate (27) through a thread; the piston plate (27) is located in the oil tank (25); openings penetrating therethrough are formed in a bottom of the oil tank (25) and in the tops of the mounting sleeve (2) and the detection tooth ring (14); and the openings in the bottom of the oil tank (25) and in the tops of the mounting sleeve (2) and the detection tooth ring (14) and the oil slot (28) formed in the inner wall of the detection tooth ring (14) interpenetrate each other.

2. The assembling device for the rotating joint of the rotary drying equipment according to claim 1, wherein a top of each bevel gear (4) is connected with a guide rod (41); one end of each guide rod (41) is located at the top of the mounting sleeve (2); and the guide rods (41) are connected with the second screw rod (26) through synchronous belts (42).

3. The assembling device for the rotating joint of the rotary drying equipment according to claim 1, wherein the fixed rods (7) abut against and slide in the movement slots (6) through the first screw rods (5); the fixed plate (8) at one end of each fixed rod (7) is of an inwards sunken arc-shaped structure; the fixed rods (7) are distributed in the mounting sleeve (2) at an equal angle; and inner ends of the fixed plates (8) are adhered with rubber sheets.

4. The assembling device for the rotating joint of the rotary drying equipment according to claim 1, wherein a front section of the detection tooth ring (14) is of an "I"-shaped structural design, and the detection tooth ring (14) and the mounting sleeve (2) have a same central axis.

5. The assembling device for the rotating joint of the rotary drying equipment according to claim 1, wherein the detection seat (16) abuts against and slides through the first elastic telescopic rod (15); and the detection seat (16) is parallel to each fixed rods (7).

6. The assembling device for the rotating joint of the rotary drying equipment according to claim 1, wherein the adjustment head (21) at the end portion of the adjustment rod (20) is of an arc-shaped protrusion structural design; and a position of the adjustment rod (20) corresponds to a position of the laser ranger (18).

7. The assembling device for the rotating joint of the rotary drying equipment according to claim 1, wherein an end portion of the cross bar (23) is of an inclined structural design; and the inclined end of the cross bar (23) is parallel to a bottom inclined plane of the guide slot (24).

\* \* \* \* \*